United States Patent
King

[11] 3,904,484
[45] Sept. 9, 1975

[54] ETHYLBENZENE-STYRENE SEPARATION
[75] Inventor: Norman B. King, Wayland, Mass.
[73] Assignee: The Badger Company, Inc., Cambridge, Mass.
[22] Filed: Sept. 7, 1972
[21] Appl. No.: 287,107

[52] U.S. Cl. .................. 203/52; 203/69; 203/70; 203/78; 203/DIG. 6; 260/669 A; 260/674 A
[51] Int. Cl.² ..................................... B01D 3/34
[58] Field of Search......... 260/669 A, 669 R, 674 A; 203/69, 52, 68, 70, 8, 9, 78, 80, 84, 203, DIG. 6

[56] References Cited
UNITED STATES PATENTS

| | | | |
|---|---|---|---|
| 2,757,130 | 7/1956 | Burns.................................... | 203/8 |
| 2,807,572 | 9/1957 | Zoller et al. .......................... | 203/9 |
| 2,959,626 | 11/1960 | Krausse et al. ....................... | 203/84 |
| 3,084,108 | 4/1963 | Randall................................. | 260/669 A |
| 3,152,051 | 10/1964 | Fainberg et al....................... | 203/78 |
| 3,209,044 | 9/1965 | Meck et al........................... | 260/669 A |
| 3,294,856 | 12/1966 | Huckins................................ | 260/669 R |
| 3,300,531 | 1/1967 | James et al. ......................... | 203/84 |
| 3,365,374 | 1/1968 | Short et al. .......................... | 203/78 |
| 3,515,647 | 6/1970 | Van Tassell et al. ................. | 260/669 R |
| 3,525,776 | 8/1970 | Berger.................................. | 260/669 R |
| 3,629,076 | 12/1971 | Jones.................................... | 203/9 |
| 3,719,720 | 3/1973 | Ber et al. ............................. | 260/669 A |

Primary Examiner—Norman Yudkoff
Assistant Examiner—Frank Sever
Attorney, Agent, or Firm—Schiller & Pandiscio

[57] ABSTRACT

An improved method of separating styrene monomer product and unreacted ethylbenzene from the effluent produced in the dehydrogenation of ethylbenzene to styrene. The separation is effected by distillation under moderate reduced pressure and in the presence of added styrene tar residue. The added styrene tar residue increases the relative volatility between ethylbenzene and styrene monomer and depresses polymerization of styrene monomer during the distillation.

5 Claims, 1 Drawing Figure

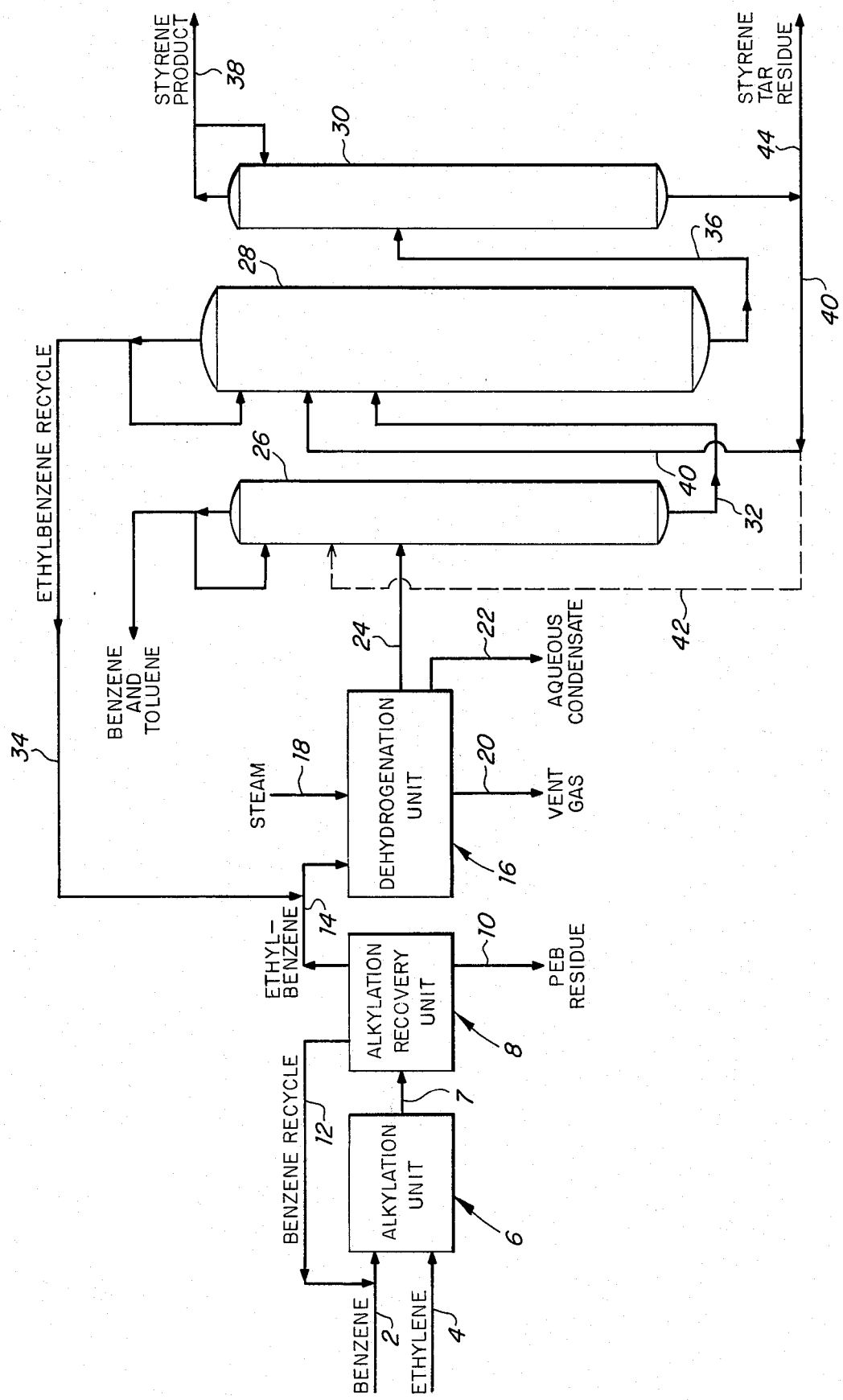

ETHYLBENZENE-STYRENE SEPARATION

This invention relates to an improves system and process for producing styrene. More particularly it provides a system and process for the separation of styrene monomer product from the effluent of a dehydrogenation reaction of alkylated aromatic products (e.g., ethylbenzene).

Due largely to its utility in the production of plastics and synthetic rubbers, styrene has achieved considerable industrial importance. It can be homopolymerized to produce polystyrene, a widely used synthetic resin, and can be copolymerized with different monomers to yield resins which are suitable for manufacturing articles by molding, casting and the like.

It is well known that styrene can be produced by passing a mixture of ethylbenzene and steam over a bed of a suitable dehydrogenation catalyst, e.g., iron oxide, at elevated temperatures. Typically, the styrene monomer is produced by first reacting benzene and ethylene feedstocks in the presence of a suitable alkylation catalyst so as to form ethylbenzene. Then the ethylbenzene is admixed with superheated steam and passed over a bed of a suitable catalyst so as to dehydrogenate the ethylbenzene to styrene monomer. The dehydrogenation is an equilibrium reaction which limits the percent conversion of ethylbenzene. In addition, many side reactions occur simultaneously with the dehydrogenation reaction. The dehydrogenation reaction effluent is a complex mixture of hydrocarbons and comprises, in addition to the styrene monomer, several other products among which may be mentioned unreacted ethylbenzene, benzene, toluene, and styrene tar residue. The latter comprises primarily styrene polymers together with $C_9^+$ aromatics and other hydrocarbons, some styrene monomer, and polymerization inhibitors and the like. Benzene is commonly separated from the reaction effluent and recycled to an alkylation reactor where it is combined with fresh benzene feed and alkylated to fresh ethylbenzene. The ethylbenzene is commonly separated and recycled to the dehydrogenation reactor where it is combined with fresh ethylbenzene feed. However, the styrene tar residue is a low value by-product and has heretofore been disposed of. However, disposal of styrene tar residue is normally a problem from an ecological standpoint.

Separation of the reaction products is normally carried out in a series of fractional distillation columns. The separation of styrene monomer from unreacted ethylbenzene has been the most difficult of the reaction product separations for a number of reasons. First of all, the boiling points of ethylbenzene and styrene, 136.15°C at 760 mm Hg and 146.0°C at 760 mm Hg, respectively, are so close as to make separation by fractional distillation difficult. Furthermore, styrene monomer is extremely heat sensitive. As a result, the separation of the two components has been commonly carried out under moderate reduced pressure using relatively large diameter distillation columns having a large number of plates or trays. Such distillation columns are expensive and typically may represent an appreciable portion of the capital cost of an entire styrene monomer installation. Furthermore, such large diameter columns require large inputs of heat energy and large quantities of cooling medium, e.g., cold water, for condensing the vapors.

Accordingly, the primary object of the present invention is to provide an improved method for separating styrene monomer product from the reaction effluent of an ethylbenzene dehydrogenation reaction.

Other objects are to provide a method which reduces the capital equipment and energy requirement involved in separating ethylbenzene and styrene monomer, and wherein at least a portion of the styrene tar residue formed during the production of crude styrene monomer from ethylbenzene and the subsequent processing thereof (e.g., recovery and purification) is advantageously used. More specific objects are to reduce the size of the distillation unit and the energy required to separate ethylbenzene and styrene monomer and to reduce formation of styrene tar residue in the course of such distillation separation.

Basically, these and other objects are accomplished in the present invention by a system which involves distilling the dehydrogenation reaction effluent comprising ethylbenzene and styrene monomer in the presence of added styrene tar residue. The styrene tar residue may be added to the reaction effluent at a point upstream of the separation of the styrene monomer and ethylbenzene but preferably is added to the ethylbenzene-styrene separation column at a point above where the reaction effluent is fed to the column. The reaction hydrocarbon effluent is fractionated in a multi-stage distillation unit comprising a plurality of distillation sections. Benzene, toluene, and other low boiling by-products are separated first and are recycled or disposed of. The remaining components of the dehydrogenation reaction effluent, comprising unreacted ethylbenzene, styrene monomer product, and styrene tar residue, are then subjected to further fractional distillation whereby unreacted ethylbenzene is recovered as overhead and is recycled as feedstock to the dehydrogenation reaction. The liquid bottoms from the ethylbenzene distillation stage, comprising styrene monomer product and styrene tar residue, is passed to another distillation section where substantially pure styrene monomer product is recovered as overhead and styrene tar residue is recovered as a bottoms fraction. At least a portion of the styrene tar residue fraction is preferably added to the upper trays of the ethylbenzene-styrene separation column at a point above the reaction effluent feed tray and admixed with the reflux liquid on the tray. Alternatively, a portion of the styrene tar residue may be admixed with the dehydrogenation reaction effluent at a point upstream of the separation of the styrene monomer and ethylbenzene. The remainder, if any, of the styrene tar residue is withdrawn from the system and disposed of.

The objects, specific nature and many of the attendant advantages of the present invention are described or rendered obvious by the following detailed description taken in connection with the accompanying drawing which is a schematic illustration of a preferred embodiment thereof.

Referring now to the drawing, there is shown a process for producing styrene that incorporates a preferred embodiment of the invention. The illustrated process is normally continuous with benzene, ethylene and steam being constantly supplied to the system and styrene being constantly recovered as product. Benzene and ethylene are supplied via appropriate supply lines 2 and 4 respectively to an alkylation unit 6 which contains an appropriate alkylation catalyst and is operated under conditions suitable for the benzene and ethylene to react to form ethylbenzene. The effluent from the alkylation unit 6 is supplied via a line 7 to an alkylation recovery unit 8 comprising a multi-column distillation section which is designed and operated to separate the effluent into three discrete fractions, a fraction consisting for the most part of polyethylbenzene residue, a fraction consisting essentially of unreacted benzene, and a fraction consisting of ethylbenzene. The polyethylbenzene (PEB) residue fraction is removed via a line 10 and may be discarded or recovered for use or further treatment elsewhere. The benzene fraction is recycled via a line 12 to the alkylation unit 6. The ethylbenzene fraction is delivered via a line 14 to the dehydrogenation unit 16.

The dehydrogenation unit 16 comprises a catalytic dehydrogenation reaction section that is operated so as to convert ethylbenzene to styrene. Any suitable ethylbenzene dehydrogenation catalyst may be employed in the reaction section of unit 16. Typical of the commercially available catalysts that may be used are those having the following composition: (a) 90% $Fe_2O_3$, 4% $Cr_2O_3$, and 6% $K_2CO_3$; (b) 62.5% $Fe_2O_3$, 2.2% $Cr_2O_3$, and 35.3% $K_2O$; (c) 60–95% iron oxide, 4–39% potassium oxide and 1–10% chromium oxide; (d) 5–60% cobalt oxide, 10–60% iron oxide, 4–39% potassium oxide and 1–10% chromium oxide; and (e) 50–90% iron oxide, 9–49% calcium oxide and 1–4% chromium oxide. Still other suitable dehydrogenation catalysts well known to persons skilled in the art may be used.

The reaction section of the dehydrogenation unit 16 may be operated at atmospheric or elevated or reduced pressures. The dehydrogenation temperature should be in the range of about 1,000°–1,200°F and preferably about 1,050°–1,175°F. Also introduced into the dehydrogenation reaction section via a line 18 is steam. Preferably the steam is super-heated to a temperature at or near the temperature at which ethylbenzene begins to pyrolize. As is well known, the dehydrogenation reaction produces styrene plus a number of by-products, including benzene, toluene, styrene tar residue and a dehydrogenation vent gas which typically contains hydrogen, methane, and carbon dioxide. The dehydrogenation unit 16 also includes means for recovering the dehydrogenation vent gases, and aqueous condensate. The dehydrogenation vent gases are separated from the remaining reactor effluent via a line 20 and may be utilized as fuel to heat the incoming steam. Alternatively, the vent gases may be delivered to other storage or disposal facilities. Aqueous condensate is recovered via a line 22.

Further details of the construction and operating requirements of the alkylation unit 6, alkylation recovery unit 8 and dehydrogenation unit 16 are not believed to be required herein since such units are well known in the art and also because the novel features of the invention reside elsewhere in the illustrated system. Illustrative of the prior art are U.S. Pat. Nos. 2,831,907, 3,100,807, 3,223,743, 3,306,942, 3,409,689, and 3,417,156, and the references cited therein.

Stripped of vent gases and aqueous condensate, the product effluent hydrocarbon from the dehydrogenation unit 16 is delivered via a line 24 to a multi-stage fractional distillation unit which comprises three sections illustrated as distillation columns 26, 28 and 30 that are designed and operated so as to effect separation of the product hydrocarbon reactor effluent into unreacted ethylbenzene, styrene monomer, styrene tar residue and benzene-toluene by-product. As is obvious to persons skilled in the art, each of the three distillation sections may comprise more than one distillation column.

Distillation column 26 is operated so as to recover a mixture of toluene and benzene as overhead. By way of example, the distillation column 26 may be designed to operate at bottom or base pressures in the range of about 150–500 mm Hg, and at bottom temperatures in the range of about 125°–275°F. Although not shown, it is to be understood that the benzene-toluene overhead fraction recovered from column 26 may be fractionally distilled to effect separation of the benzene and toluene; and the recovered benzene may be recycled to the alkylation unit 6 and the recovered toluene recycled to the dehydrogenation unit 16 (see British Pat. No. 1,238,602 dated Oct. 27, 1969 for Toluene Recycling). The toluene recycled to the dehydrogenation unit 16 is dealkylated to form additional benzene and methane. The benzene which is produced by this dealkylation of the toluene may be recycled to the alkylation unit 6.

The bottoms fraction from distillation column 26, consisting primarily of unreacted ethylbenzene, styrene monomer and styrene tar residue, is fed via a line 32 to a second distillation column 28. The latter is designed and operated so as to effect separation of the feed into an overhead fraction consisting almost wholly of unreacted ethylbenzene, and a bottoms fraction rich in styrene and polystyrene residue. By way of example, the ethylbenzene column 28 may be operated at bottom pressures in the range of about 150–500 mm Hg and at bottom temperatures in the range of about 125°–275°F. The unreacted ethylbenzene overhead fraction is recovered and preferably is recycled via a line 34 to the dehydrogenation unit 16.

The styrene monomer and styrene tar residue recovered from the ethylbenzene column 28 are fed via a line 36 to distillation column 30. The latter is designed and operated so as to effect separation of the styrene monomer and styrene tar residue as overhead and bottom fractions respectively. By way of example, the distillation column 30 may be designed to operate at bottom pressures in the range of about 60–180 mm Hg, and at bottom temperatures in the range of about 100°–200°F, with the result that substantially pure styrene monomer is recovered and removed as product via a line 38. The styrene tar residue usually consists mostly of styrene polymers which boil at a higher temperature than styrene monomer, plus higher boiling aromatic compounds and polymerization inhibitors which are added to the dehydrogenation reaction effluent to limit styrene polymerization. In accordance with this invention, the styrene tar residue is recovered and recycled via a line 40 for admixture with the hydrocarbon reaction effluent from the dehydrogenation unit 16 at a point coincident with or prior to the separation of the unreacted ethylbenzene and styrene monomer. Thus, as shown in the drawing, the styrene tar residue is fed via line 40 into the top of the ethylbenzene column 28 above the reaction effluent feed tray but below the top tray of the column. Alternatively, the styrene tar residue may be fed to a point further upstream of the ethylbenzene column, e.g., to the benzene-toluene column 26 via line 42. As an optional measure, the styrene tar residue may be added directly to line 32 or to line 24 for direct admixture with the feed to column 28 or 26 respectively. A portion of the styrene tar residue may also be withdrawn from the system via line 44 for disposal.

It has been found that adding styrene tar residue to the reaction effluent facilitates the separation of ethylbenzene and styrene. In particular, it has been found that the presence of styrene tar residue in the dehydrogenation reaction effluent increases the relative volatility between ethylbenzene and styrene monomer and this increased relative volatility makes it easier to effect separation by distillation. Additionally, the added styrene tar residue reduces the heat sensitivity of styrene monomer and thereby suppresses polymerization of the latter during the fractional distillation separation of the ethylbenzene. The latter effect is believed to be due to a synergistic effect on polymerization inhibitors that are normally present or are added to the dehydrogenation reaction effluent prior to the distillations. In any event, the overall effect of the addition of the styrene tar residue to the dehydrogenation reaction effluent is that the ethylbenzene-styrene monomer separation may be run at higher pressures and temperatures and with lower energy input than the prior art with decreased polymerization or decomposition of the styrene monomer. As will be appreciated by one skilled in the art, this means that distillation columns of smaller diameter and fewer trays may be used. Such columns cost less than the larger columns. Furthermore, the smaller columns have lower heat input requirements and lower cooling requirements, i.e., require less water or other cooling medium to effect condensation. Thus, ethylbenzene-styrene separation conducted in accordance with this invention is more economical from a standpoint of capital investment and operating costs.

The amount of styrene tar residue added to the dehydrogenation reaction effluent may vary over a relatively wide range. Preferably, the styrene tar residue is added to the dehydrogenation reaction product stream in liquid volume ratios ranging from a lower limit of about 1 part residue to about 20 parts reaction product to an upper limit of about 20 parts residue to about 1 part reaction product. Also, it may be necessary to cool the liquid styrene tar residue somewhat before it is added to the reaction product. Thus, it is preferred that if the styrene tar residue is recycled to the ethylbenzene column, it is cooled to about the temperature of the column at the inlet point of the styrene tar residue so as to minimize the possibility of overheating the styrene monomer therein to the extent that styrene monomer is lost by polymerization or decomposition.

The nature of the increase in relative volatility between ethylbenzene and styrene monomer achieved by the present invention is seen from the following analysis:

Given an ideal system, Raoults Law provides that the partial pressure $p_1$ of any component in a vapor is equal to the mole fraction $x$ in the liquid times the vapor pressure $P_1$ of the pure component at the same temperature:

$$p_1 = P_1 x_1; \quad p_2 = P_2 x_2 \quad (1)$$

If the gas phase is ideal, Daltons Law applies and provides that the partial pressure $p_1$ of any component in the vapor is equal to its mole fraction $y$ in the vapor times the total pressure of the system $P$:

$$p_1 = P y_1; \quad p_2 = P y_2 \quad (2)$$

Ideally, relative volatility is equal to the ratio of vapor pressure according to the equation:

$$\text{ideal} = \frac{P_1}{P_2} \quad (3)$$

However, in actuality, the vapor pressure of one component may suppress the vapor pressure of another component.

To find the actual relative volatility one combines equations (1) and (2) as follows:

$$\text{actual} = \frac{(y_1)/(x_1)}{(y_2)/(x_1)} = \frac{(y_1)(x_2)}{(y_2)(x_1)} \quad (4)$$

The art considers that relative volatility is a direct measure of the ease of separation of components by a distillation process. (see Chemical Engineer's Handbook, second edition, page 1381 (1941). Hence substances which are readily separated show large values of $\alpha$. An $\alpha$ of unity means no separation is possible, while an $\alpha < 1$ means that the molar ratio of the constituents in the vapor will be times their molar ratio in the liquid. Where a difference in volatilities exists the value of $\alpha$ will always be greater than 1, if the volatility of the more volatile be made the numerator in Eq. (3). Thus a relative volatility of 0.5 becomes $1/0.5 = 2.0$, if the ratio of volatility of the more volatile to the less volatile be used.

The following Example is illustrative of the present invention and, therefore, is not to be construed as limiting.

EXAMPLE

Mixtures of styrene monomer and ethylbenzene were separated by distillation as follows:

Two mixtures were prepared having the following makeup (all percentages by volume %):

A.
50% ethylbenzene, reagent grade (99.8+% pure)
50% styrene monomer, reagent grade (99.6+% pure)
B.
33% ethylbenzene, reagent grade (99.8% pure)
33% styrene monomer, reagent grade (99.6+% pure)
33% styrene tar residue obtained from commercial finishing operation The styrene tar residue in mixture B had the following composition by weight: 11.3% styrene monomer; 3.8% $C_9^+$ aromatics; 71.8% styrene polymer and 13.1% sulfur.

The mixtures were distilled in separate runs in a 500 ml flask. In each run the liquid and vapor were allowed to attain equilibrium at total reflux. Samples of distillation flask liquid and vapor condensate were taken at equilibrium and analyzed by vapor phase chromatography. The results are shown in the following table (all mol percents measured on a residue free basis):

| Run (A) | Vol% Feed | Mol% Liquid | Mol% Vapor | Oper. Press. mm Hg | Oper. Temp. °F |
|---|---|---|---|---|---|
| Ethylbenzene | 50 | 50.36 | 55.64 | | |
| Styrene | 50 | 49.64 | 44.36 | 470 | 250°F |
| Residue | 0 | — | — | | |

-Continued

| Run (A) | Vol% Feed | Mol% Liquid | Mol% Vapor | Oper. Press. mm Hg | Oper. Temp. °F |
|---|---|---|---|---|---|
| Run (B) | | | | | |
| Ethylbenzene | 33 | 43.40 | 52.12 | | |
| Styrene | 33 | 56.60 | 47.88 | 470 | 260°F |
| Residue | 33 | — | — | | |

The ideal and the actual relative volatilities were calculated using the experimental data from the above table and equations (3) and (4) were found to be as follows:

| | Experiment $\alpha$ | Ideal |
|---|---|---|
| Run (A) | 1.236 | 1.300 |
| Run (B) | 1.420 | 1.291 |

It was found that the addition of residue to the distillation mixture in Run (B) enhanced the relative volatility from an ideal value of 1.291 to 1.420 or from an experimental value of 1.236 without residue to 1.420 with residue. This represents an approximate 50% increase in the separability of ethylbenzene and styrene under the above conditions.

EXAMPLE II

Referring to the accompanying flow sheet, the alkylation rereaction section in alkylation unit 6 contains a liquid aluminum chloride complex and the reaction section of dehydrogenation unit 16 contains a fixed bed of catalyst consisting of 90% $Fe_2O_3$, 4% $Cr_2O_3$ and 6% $K_2CO_3$. Benzene and ethylene are delivered to the alkylation reaction section of alkylation unit 6 at respective temperatures of about 100° and 60°F and respective rates of about 184,000 and 20,000 pounds per hour. The product effluent from the alkylation reaction section is delivered at a temperature of approximately 100°F to the alkylation recovery unit 8. Unreacted benzene is recovered from the distillation section of the alkylation recovery unit 8 at a rate of about 130,000 pounds per hour and at a temperature of approximately 100°F and is recycled to the alkylation unit 6. Polyethylbenzene residue is recovered from the distillation section of the alkylation recovery unit 8 as a bottoms product and removed via line 10. Ethylbenzene is removed as an overhead fraction from the distillation section of the alkylation recovery unit 8 at a purity of 99+% at a temperature of 100°F and at a rate of approximately 73,000 pounds per hour. The ethylbenzene product is fed via line 14 to the reaction section of dehydrogenation unit 16 and simultaneously steam is introduced to the same reaction section at the rate of approximately 330,000 pounds per hour. The steam is superheated to approximately 1,400°F before entering the reaction section proper. The liquid dehydrogenation reactor effluent is fed at a temperature of about 200°F to the benzene-toluene distillation column 26 which is operated at a base pressure of about 260 mm Hg and a base temperature of about 225°F. A benzene-toluene mixture is recovered as an overhead fraction from column 26, while the remaining hydrocarbons are recovered as a bottoms product and fed to the ethylbenzene column 28. The latter is operated at a base temperature of about 250°F and a base pressure of about 260 mm Hg. A 97% pure ethylbenzene fraction is recovered as overhead from column 28 and recycled to the dehydrogenation unit 16 at a rate of about 53,000 pounds per hour.

The bottoms fraction from ethylbenzene column 28, consisting almost wholly of styrene monomer and styrene tar residue, is fed continuously to distillation column 30 which is operated at a base temperature of about 165°F and a base pressure of about 70 mm Hg. Styrene monomer product is removed as overhead at a rate of about 62,500 pounds per hour and styrene tar residue is removed as a liquid bottoms fraction at a rate of about 60,000 pounds per hour. A portion of this bottoms fraction is recycled to the ethlbenzene recycle column 28 at a rate supplying 1 part by volume of tar residue for each 2 parts by volume of dehydrogenation reactor liquid effluent passed to the benzene-toluene column via line 24.

It is to be noted that the ethylbenzene column 28 may be operated at the same low pressures used in the prior art, e.g., about 100–200 mm Hg, but that one of the advantages of this invention is that it permits use of higher operating pressures. Preferably the ethylbenzene column is operated at bottom pressures of 200–350 mm Hg. The invention also makes it possible to operate the styrene column at higher bottom temperatures and at lower energy requirements than is the custom in the prior art.

It is to be appreciated that the invention is applicable to dehydrogenation of alkylated aromatic hydrocarbons other than ethylbenzene. Thus, for example, diethylbenzene and isopropylbenzene may be dehydrogenated to produce homologues of styrene. In each case the tar residue produced is added to the hydrogenation reaction effluent prior to or coincident with fractional distillation separation of the unreacted ethylbenzene homolog in the manner above described.

What is claimed is:

1. In a process involving dehydrogenation of ethylbenzene in admixture with superheated steam in a dehydrogenation reactor to produce styrene monomer and by-product styrene tar residue, and fractionally distilling the dehydrogenation reaction effluent under subatmospheric pressure in a multi-stage distillation unit comprising a plurality of distillation stages to separately recover styrene monomer, lower boiling aromatics, primarily unreacted ethylbenzene and by-product styrene tar residue comprising styrene polymers, $C_9^+$ aromatic hydrocarbons and polymerization inhibitors, the improvement comprising recycling previously recovered styrene tar residue to said dehydrogenation reaction effluent at a point upstream of the separation of said styrene monomer and ethylbenzene so as to maintain a liquid volume ratio in the range of from about 1 to 20 volumes of styrene tar residue to 20 to 1 volumes of the reaction effluent, and distilling the dehydrogenation reaction effluent in the presence of said recycled styrene tar residue.

2. A process of increasing the relative volatility between ethylbenzene and styrene monomer in admixture so as to facilitate separation of the admixture by distillation, comprising recovering styrene tar residue in the course of said distillation and, at a point upstream of the separation of said styrene monomer and ethylbenzene, adding previously recovered styrene tar residue comprising primarily styrene polymers to the admixture so as to maintain a liquid volume ratio in the range of from about 1 to 20 volumes of styrene tar residue to 20 to 1 volumes of the ethylbenzene-styrene monomer admixture and distilling said admixture in the presence of said styrene tar residue.

3. A process according to claim 1 wherein the fractional distillation comprises the steps of fractionally distilling said dehydrogenation reaction effluent in a first distillation column to recover a fraction essentially comprising ethylbenzene, styrene monomer and styrene tar residue, fractionally distilling said fraction in a second distillation column to recover a fraction comprising styrene monomer and styrene tar residue, and fractionally distilling said latter fraction in a third distillation column to separately recover styrene monomer product and styrene tar residue, and further wherein at least a portion of said styrene tar residue is recycled to said second column.

4. A process according to claim 3 further including the step of cooling said styrene tar residue prior to introducing it to said second column.

5. A process according to claim 1 wherein the fractional distillation separation of ethylbenzene from styrene is conducted at a pressure in the range of about 150 to about 500 mm Hg.

* * * * *